(12) United States Patent
Hernandez

(10) Patent No.: US 7,021,939 B1
(45) Date of Patent: Apr. 4, 2006

(54) SYSTEM AND METHOD FOR DETERMINING AREA OF IRREGULAR OR COMPLEX SHAPES

(76) Inventor: Arnulfo Hernandez, 389 De Lavan St. #1, New Brunswick, NJ (US) 08901

( * ) Notice: Subject to any disclaimer, the term of this patent is extended or adjusted under 35 U.S.C. 154(b) by 0 days.

(21) Appl. No.: 10/374,174

(22) Filed: Feb. 25, 2003

(51) Int. Cl.
*G09B 19/02* (2006.01)

(52) U.S. Cl. ..................................... 434/194
(58) Field of Classification Search ............... 434/194, 434/88, 211; 177/190
See application file for complete search history.

(56) References Cited

U.S. PATENT DOCUMENTS

| | | | |
|---|---|---|---|
| D170,753 S | 11/1953 | Fukal | |
| 3,802,904 A * | 4/1974 | Morrison | 427/282 |
| 4,106,220 A * | 8/1978 | Hurd | 434/194 |
| 4,328,051 A * | 5/1982 | Robinette | 156/62 |
| 4,652,239 A | 3/1987 | Brimberg | |
| 4,659,409 A | 4/1987 | Arafat | |
| 4,822,283 A | 4/1989 | Roberts | |
| 4,863,537 A * | 9/1989 | Sadri | 156/62 |
| 4,871,314 A * | 10/1989 | Shih | 434/194 |
| 4,972,319 A | 11/1990 | Delorme | |
| 5,110,295 A * | 5/1992 | Concra | 434/88 |
| 5,505,620 A | 4/1996 | Barlett | |
| 6,045,639 A * | 4/2000 | Davis | 156/62 |

\* cited by examiner

*Primary Examiner*—Dmitry Suhol
(74) *Attorney, Agent, or Firm*—Walter J. Tencza, Jr.

(57) ABSTRACT

A system and method for determining area of irregular or complex shapes for easily determining area of complex shapes. The system and method for determining area of irregular or complex shapes includes comprises a quantity of tracing paper for capturing a two dimensional representation of the irregular shape, a quantity of a substrate having a known weight per unit of area, the substrate being for receiving a two dimensional representation of the irregular shape transferred from the tracing paper, and a scale for determining a weight of a two dimensional representation cut from said substrate.

6 Claims, 3 Drawing Sheets

SYSTEM AND METHOD FOR DETERMINING AREA OF IRREGULAR OR COMPLEX SHAPES

BACKGROUND OF THE INVENTION

1. Field of the Invention

The present invention relates to area determining systems and more particularly pertains to a new system and method for determinng area of irregular or complex shapes for easily determining area of complex shapes.

2. Description of the Prior Art

The use of area determining systems is known in the prior art. U.S. Pat. No. 4,652,239 describes a system for the use of space in conjunction with floor plans. Another type of area determining systems is U.S. Pat. No. 4,659,409 having a template based system.

While these devices fulfill their respective, particular objectives and requirements, the need remains for a system and method that allows a wide range of user defined complex and or irregular shapes to be utilized and accurately determine the area used.

SUMMARY OF THE INVENTION

The present invention meets the needs presented above by allowing a two dimensional representation of the irregular or complex shape to be capture on a substrate and determining the area used by weighing the two dimensional representation and referencing the weight against a known sample.

Still yet another object of the present invention is to provide a new system and method for determinng area of irregular or complex shapes that does not require complex mathematics.

Even still another object of the present invention is to provide a new system and method for determinng area of irregular or complex shapes that can be utilized in educational setting for helping children to learn spatial relationships.

To this end, the present invention generally comprises a quantity of tracing paper for capturing a two dimensional representation of the irregular shape, a quantity of a substrate having a known weight per unit of area, the substrate being for receiving a two dimensional representation of the irregular shape transferred from the tracing paper, and a scale for determining a weight of a two dimensional representation cut from said substrate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
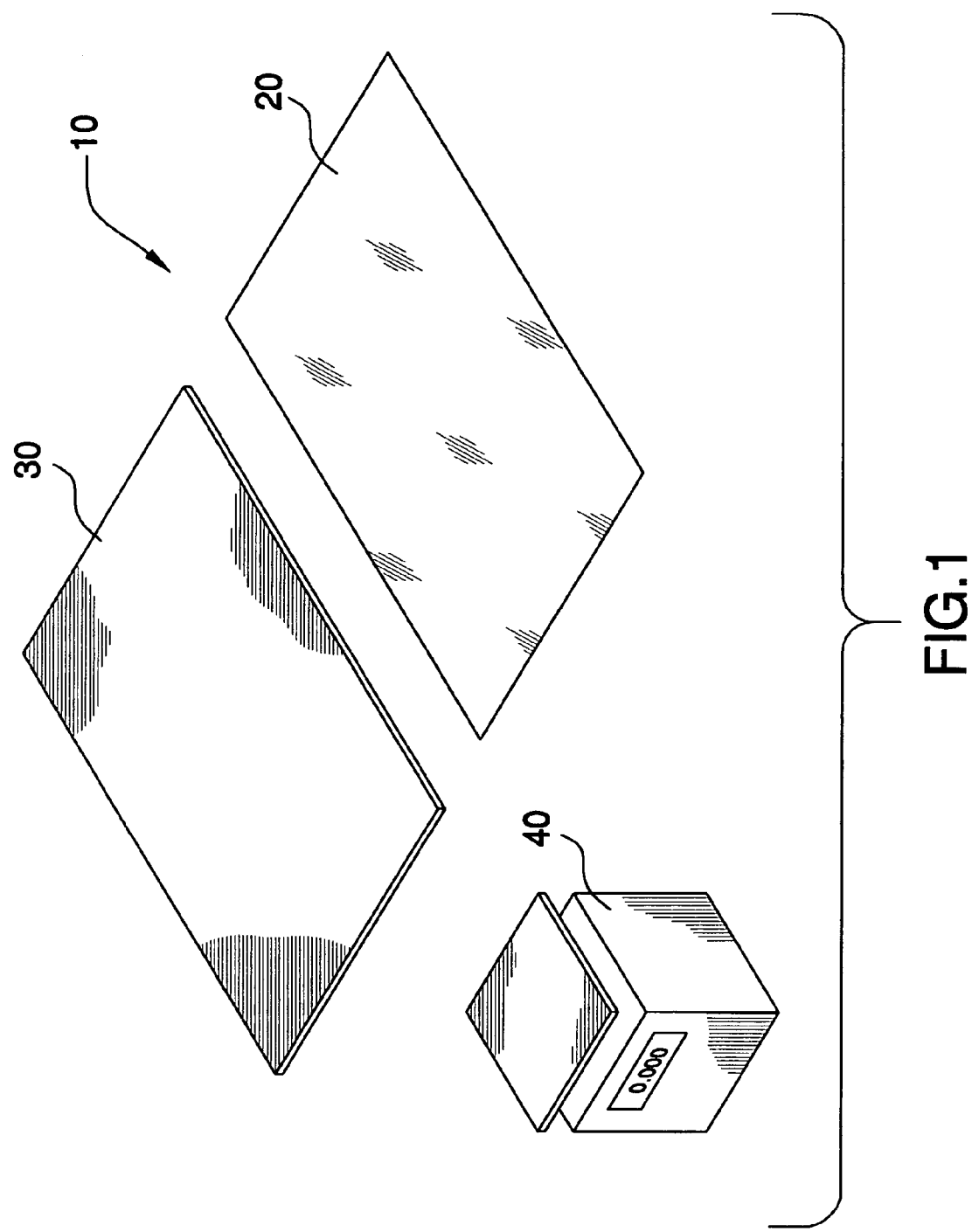
FIG. 1 is a schematic perspective view of a new system for determinng area of irregular or complex shapes according to the present invention.
Figure 2:
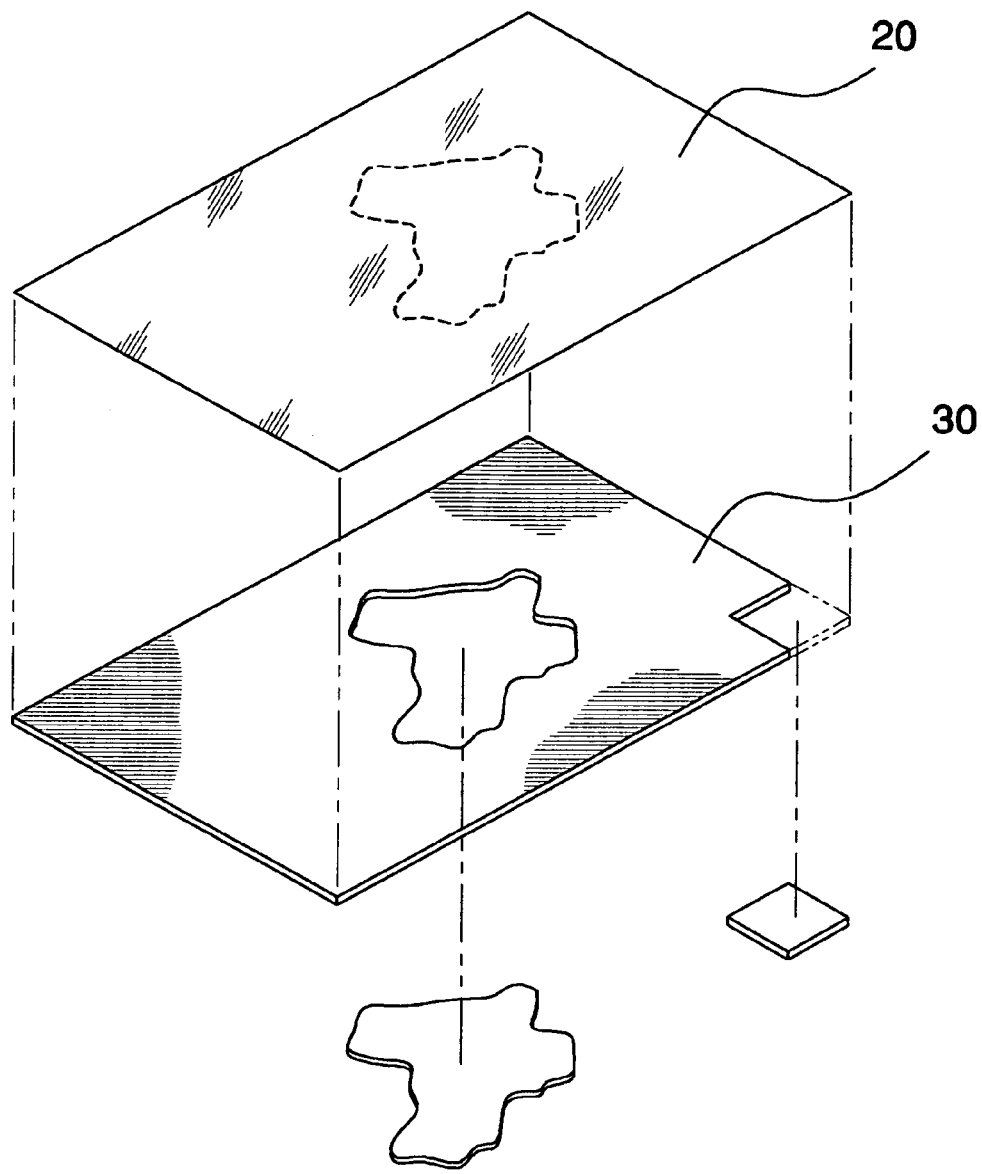
FIG. 2 is a schematic perspective view of the tracing paper and substrate of the present invention in use.
Figure 3:
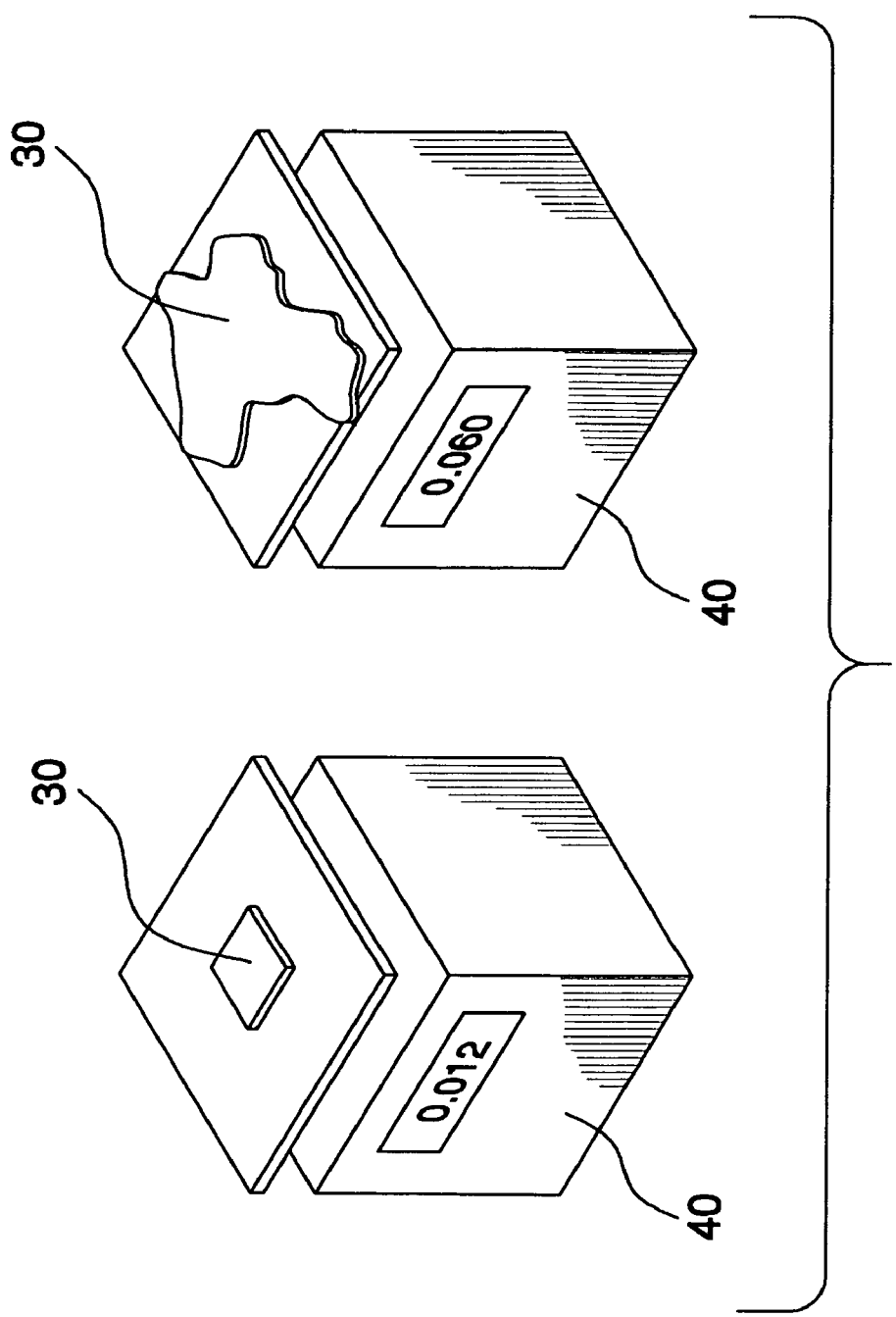
FIG. 3 is a schematic perspective view of the substrate cut-out and reference sample in use along with the scale of the present invention.

With reference now to the drawings, and in particular to FIGS. 1 through 3 thereof, a new system and method for determinng area of irregular or complex shapes embodying the principles and concepts of the present invention and generally designated by the reference numeral 10 will be described.

As best illustrated in FIGS. 1 through 3, the system and method for determinng area of irregular or complex shapes 10 generally comprises a quantity of tracing paper 20 for capturing a two dimensional representation of the irregular shape, a quantity of a substrate 30 having a known weight per unit of area, the substrate 30 being for receiving a two dimensional representation of the irregular shape transferred from the tracing paper 20, and a scale 40 for determining a weight of a two dimensional representation cut from said substrate 30.

In use, a scale for determining weight, a quantity of a substrate, and a quantity of tracing paper are provided. The tracing paper is placed over a two dimensional representation of the irregular shape. The irregular shape is traced from the two dimensional representation onto the tracing paper creating an outline. The tracing paper is placed onto the substrate. The outline is transferred onto the substrate forming perimeter lines. The substrate is cut along the perimeter lines creating a cut-out. The cut-out is then weighed. A reference sample of the substrate is either provided or cut from the substrate. The reference sample has a known area and known weight. Thus, a ratio of the weight of the cut-out divided by the weight of the reference sample multiplied by the area of the reference sample provides the area of the cut-out.

A further use of the system and method may include using a two dimensional representation of a geographical area, common known as a "map". The map would have a known scale for determining distances on the map. As an illustrative example only, one such scale may be one inch on the map is represents one mile. The two dimensional representation may be used as a whole, or a subset may be used either by cutting the map or by tracing the areas to be used and transferring them to the substrate as described above.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of determining area of an irregular shape comprising:

providing a scale for determining weight;
providing a quantity of a substrate;
providing a quantity of tracing paper;
placing said tracing paper over a two dimensional representation of the irregular shape;
tracing the irregular shape from the two dimensional representation onto said tracing paper creating an outline;
placing said tracing paper onto said substrate;
tracing said outline onto said substrate forming perimeter lines;
cutting said substrate along said perimeter lines creating a cut-out;
weighing said cut-out;
providing a reference sample of said substrate, said reference sample having a known area and known weight whereby a ratio of the weight of the cut-out divided by the weight of said reference sample multiplied by the area of said reference sample provides the area of the cut-out;
determining area of said cut-out based upon weight of said cut-out.

2. The method of claim 1, further comprising:

obtaining a representation of a geographic region to have an area determined;
using said representation of a geographic region as a two dimensional representation;
multiplying an area determined by said step of determining area of said cut-out based upon weight of said cut-out;
determining the true area of the geographic region.

3. The method of claim 2 wherein
the step of weighing said cut-out is performed without using said reference sample.

4. The method of claim 3 wherein
the step of weighing said cut-out is performed by placing said cut-out on the scale and weighing the cut-out;
and wherein the reference sample is not on the scale while the cut-out is on the scale and being weighed.

5. The method of claim 1 wherein
the step of weighing said cut-out is performed without using said reference sample.

6. The method of claim 5 wherein
the step of weighing said cut-out is performed by placing said cut-out on the scale and weighing said cut-out;
and wherein the reference sample is not on the scale while the cut-out is on the scale and being weighed.

\* \* \* \* \*